US008835849B1

(12) United States Patent
Williams (10) Patent No.: US 8,835,849 B1
(45) Date of Patent: Sep. 16, 2014

(54) METHOD AND APPARATUS FOR DETECTION OF CONCEALED OBJECTS IN PASSIVE THERMAL IMAGES USING ENVIRONMENT CONTROL (75) Inventor: Thomas D. Williams, Shutesbury, MA (US)

(73) Assignee: MVT Equity LLC, New York, NY (US)

( * ) Notice: Subject to any disclaimer, the term of this patent is extended or adjusted under 35 U.S.C. 154(b) by 324 days.

(21) Appl. No.: 13/024,853

(22) Filed: Feb. 10, 2011

Related U.S. Application Data (60) Provisional application No. 61/303,103, filed on Feb. 10, 2010, provisional application No. 61/303,048, filed on Feb. 10, 2010.

(51) Int. Cl.
*G01J 1/00* (2006.01)
*G01S 13/88* (2006.01)

(52) U.S. Cl.
CPC .................................. *G01S 13/887* (2013.01)
USPC ........................................ 250/336.1; 348/162

(58) Field of Classification Search
CPC .................................................... G01S 13/887
USPC ........................................ 348/162; 250/336.1
See application file for complete search history.

(56) References Cited

U.S. PATENT DOCUMENTS 4,521,861 A * 6/1985 Logan et al. ..................... 702/57
5,073,782 A * 12/1991 Huguenin et al. ............ 342/179
5,227,800 A 7/1993 Huguenin et al.
7,116,798 B1 10/2006 Chawla
7,889,113 B2 * 2/2011 Cardiasmenos et al. ........ 342/22
7,982,656 B2 * 7/2011 Coward et al. ................... 342/22
8,097,855 B2 * 1/2012 Gorian et al. ................ 250/341.6
2004/0149909 A1 * 8/2004 Vaidya et al. ................ 250/338.1
2005/0110672 A1 * 5/2005 Cardiasmenos et al. ........ 342/27
2006/0018565 A1 * 1/2006 Davidson et al. ............. 382/312
2006/0022128 A1 * 2/2006 Vaidya ......................... 250/252.1
2006/0102843 A1 * 5/2006 Bazakos et al. .......... 250/339.05
2006/0104488 A1 * 5/2006 Bazakos et al. ................ 382/118
2006/0116555 A1 * 6/2006 Pavlidis et al. ................ 600/300
2006/0164285 A1 * 7/2006 Fleisher .......................... 342/22
2007/0188370 A1 * 8/2007 Coward et al. .................. 342/22
2009/0289830 A1 * 11/2009 Pergande et al. ............... 342/22
2009/0294704 A1 * 12/2009 Zailer et al. .................... 250/580

FOREIGN PATENT DOCUMENTS

EP 1884802 A1 2/2008

* cited by examiner

*Primary Examiner* — David Porta
*Assistant Examiner* — Taeho Jo
(74) *Attorney, Agent, or Firm* — Burns & Levinson LLP; Bruce D. Jobse, Esq.

(57) ABSTRACT

A method for obtaining a reflectance image from a plurality of thermal images utilizes a technique of A) obtaining a first thermal image of a subject, the first image containing both temperature and reflectance data; B) changing the environmental temperature of the scene, C) obtaining a second thermal image of the subject, the second image containing both temperature and reflectance data from the scene with said changed environmental temperature; and D) deriving a third image from the first and second images, that third image being essentially a reflectance image. In one embodiment, the third image is derived by subtracting the data in the first image from the data in the second image, or subtracting the data in the second image from the data in the first image. In another embodiment, either of the first or second images are processed along with the third image to produce a temperature image substantially devoid of reflectance information. A system for performing such techniques is also disclosed.

16 Claims, 10 Drawing Sheets

METHOD AND APPARATUS FOR DETECTION OF CONCEALED OBJECTS IN PASSIVE THERMAL IMAGES USING ENVIRONMENT CONTROL

CROSS REFERENCE TO RELATED APPLICATIONS

This application claims priority to the following U.S. Provisional Applications:
Ser. No. 61/303,048 filed Feb. 10, 2010, entitled Method and Apparatus for Detection of Concealed Objects in Passive Thermal Images Using Environment Control; and
Ser. No. 61/303,103 filed Feb. 10, 2010, entitled Method and Apparatus for Efficient Removal of Gain Fluctuation Effects in Passive Thermal Images, the disclosures of which are incorporated herein by this reference for all purposes.

In addition, this application is filed on even date herewith with U.S. Utility patent application Ser. No. 13/024,790, entitled Method And Apparatus For Efficient Removal Of Gain Fluctuation Effects In Passive Thermal Images, the disclosure of which is also incorporated herein by this reference in its entirety for all purposes.

FIELD OF THE INVENTION

The disclosed system and technique relate to passive millimeter wave imaging, and, more particularly, to a system and technique for passive millimeter wave imaging for concealed object detection.

BACKGROUND OF THE INVENTION

Various current techniques for revealing concealed objects generally fall into two general categories: active and passive. There are advantages and disadvantages to both, some of which are natural constraints, due to electromagnetic phenomena, some of which are technological and practical constraints of cost and availability of electronic components, and some of which are performance related regarding the nature of the material characteristics which are revealed and concerns of public safety and preference to not be radiated with particular forms of electromagnetic energy. In all forms of detection, either naturally occurring radiation, instrument provided radiation, or some combination is employed in the detection process.

Passive thermal images, including millimeter and other wavelengths, provide benefits in practical and safe detection of concealed objects on people. In passive millimeter wave (and other wavelengths in general) imaging for concealed object detection on people, the natural radiation from the person and the generally lower temperature environment in which the person is immersed cause a reflective object on that person to reveal itself in contrast because the object reflects a lower temperature than the body radiates. Millimeter waves are located in a part of the electromagnetic spectrum which has advantages in revealing objects concealed on humans because clothing is, for the most part, transparent at these wavelengths. However, conventional imaging of passive thermal scenes, including millimeter waves, combines both reflectance and temperature in a manner which confuses object detection, especially when the object temperature nears that of the human subject.

Various methods and apparatus are currently employed for the purpose of improving contrast by providing illumination sources. Many of these techniques suffer when applied in a practical system from sensor overload and uneven illumination. All of them are designed to accomplish the goal of enhanced detection of reflective objects. They do not, however, eliminate the effects of the temperature of the object being concealed, especially when that object is not reflective.

Detection by thermal means is complicated by the fact that the apparent (sensed) temperature of any patch of the subject or concealed object is (in a simplified form) a combination of 1) the reflectivity of the patch multiplied by the temperature of the environment it is reflecting, 2) the temperature of the patch multiplied by the emissivity of the object, and 3) the transparency of the patch multiplied by the apparent temperature of the underlying object. One serious problem facing the practical use of passive (thermal) detection of concealed objects is to detect objects which are mostly low in reflectance and partially transparent. This difficulty in detection is especially so when those concealed objects are near or in contact with the human's thermal environment and therefore near or at the human skin temperature. Examples of such concealed objects are powdered drugs, documents, liquids, and explosives. In this situation (passive thermal scene) the discriminating feature between human and concealed object is reflectivity rather than apparent temperature. In general, passive thermal detection of objects warmed to near body temperature requires that the reflectivity be determined separately from the temperature. The remaining problem in passive thermal detection is to detect objects which have either low reflectance or high reflectance regardless of their temperature.

Accordingly, need exists for a system and technique in which passive thermal images may be used for practical and safe detection of concealed objects on people and which does not suffer from the above described problems.

SUMMARY

Methods and apparatus for the detection of the wide range of concealed object reflectivity (including highly emissive/non-reflective objects) are disclosed herein wherein those objects may attain any physical temperature, including that of the human subject. In one embodiment, an environmental temperature control device is employed which, in one state, provides one temperature and, in another state, provides a second temperature, and wherein a passive millimeter wave sensor, such as a camera, records images of the subject under the two temperature conditions of the environment. The two images are processed to reveal the reflectance of the subject and of the concealed objects, without regard to their physical temperature. The processed image represents the various reflectances of the subject human, most of which are constant, and the reflectances of the concealed objects, most of which are different from the subject human. For concealed object detection and for other purposes, this same method and apparatus may derive temperature without regard to reflectance. The disclosed system and technique may be implemented in a manner which does not increase the electromagnetic energy in the environment beyond that of the normal thermal environment at any and all wavelengths.

In accordance with one aspect of the disclosure, a system for imaging a subject may comprise: A) an imaging device for capturing a thermal images of the subject, the images containing both temperature and reflectance data; B) a device for changing the environmental temperature of the scene, the device providing an illumination sufficiently large and uniform to change the effective temperature impinging on the subject at the wavelengths that the imaging device operates, and capable of being switched on and off rapidly; C) a memory coupled to the imaging device for storing the plurality of images of a subject; and D) a processor coupled to the memory for creating a processed images from data of a plurality of images, the composite images substantially devoid of temperature data from the plurality of thermal images of the subject. In another embodiment, the processor further creates a temperature image essentially devoid of reflectance. In yet another embodiment, the processor further determines the existence of a threat based on the thermal images, the image devoid of temperature, the image devoid of reflectance or any combination thereof. The above system may operate on any subset of data from the imaging device, including a single sample at any instant, a final image or plurality of images being composed from said data subsets. Any imaging device may be used with such system at any wavelength wherein the temperature of the environment is changed at least at the wavelength being sensed.

As used herein the term "pointwise" refers to a process or operation in which each value in a first data set, e.g. one image, is processed to produce a value in a second data set, e.g. a second image, in correspondence with the first data set (first image) as is understood by one skilled in the art. "Pointwise" operations may take each value of one image and process it with some other variables and/or constants to produce each value in a corresponding second image, or it may take each value of any number of images from the same corresponding location, and processing those along with any number of constants and variables to produce some final values and/or any number of images again in correspondence.

In accordance with another aspect of the disclosure, a method for obtaining a reflectance image from a plurality of thermal images representing wavelengths comprises: A) obtaining a first thermal image of a subject, the first image containing both temperature and reflectance data; B) changing the environmental temperature of the scene, C) obtaining a second thermal image of the subject, the second image containing both temperature and reflectance data from the scene with said changed environmental temperature; and D) deriving a third image from the first and second images, that third image being essentially a reflectance image. In one embodiment, the third image being derived by pointwise subtracting the data in the first image from the data in the second image, or pointwise subtracting the data in the second image from the data in the first image. In another embodiment, the third image is pointwise multiplied by the respective environmental temperature, then pointwise subtracted from the first or second image, and then pointwise divided by the third image everywhere subtracted from the value 1 to produce a temperature image substantially devoid of reflectance information.

In accordance with yet another aspect of the disclosure, a method for obtaining multiple images of a subject comprises: A) obtaining a plurality of thermal images of a subject, the plurality of images representing a mixture temperature data and reflectance data, whereupon a first subset of the plurality of the images is obtained at a first environmental temperature and a second subset of the plurality of the images is obtained at a second environmental temperature; and B) creating a third image from the data of the plurality of images, the third being a composite reflectance image substantially devoid of temperature data from the plurality of images. In one embodiment, the third image is created by pointwise subtracting one of the first and second subsets from the other of the first and second subsets. In another embodiment, the method further comprises deriving an additional temperature image from the first and second subsets and the reflectance composite image by: C1) composing a first composite image from the first subset of images obtained at the first temperature, C2) composing a second image from the second subset of images obtained at the second temperature, and C3) —pointwise multiplying the third image by the respective environmental temperature, then pointwise subtracting from the first or second image, and then pointwise dividing by the third image everywhere subtracted from the value 1 to produce a temperature image substantially devoid of reflectance information.

BRIEF DESCRIPTION OF THE DRAWINGS

Referring to the drawings.

DETAILED DESCRIPTION

The disclosed system and technique relate to passive millimeter wave imaging for concealed object detection, and more generally, to the use of any wavelength, infrared or longer, for that purpose, where the subject is essentially illuminated by the environment, and in which some changes in that environment are employed to improve performance, including illumination changes. The disclosed system and technique overcome the effects of concealed object temperature in the use of thermal sensors for concealed object detection and reveal reflectivity by the creation of a reflectance image of the subject in a passive thermal imaging system.

In one embodiment, the subject is placed in a thermal environment which is normally at some temperature below normal room temperature. The subject does not necessarily sense this lower than normal temperature because the subject may be insulated from the low temperature environment at wavelengths that the subject normally senses temperature. One image or portion of an image is obtained from the subject when illuminated by this low temperature. A device within the insulated chilled area then produces a second temperature at the wavelengths of interest, thereby bringing the effective temperature of the environment up to normal room temperature. A second image or portion of an image is obtained at this second illumination temperature. The two images, or portions of the two images, are then processed, primarily by subtraction, to produce a third image which is essentially a representation of the reflectance of the subject (and any concealed objects) and is essentially devoid of subject and object temperature. Further processing may then also produce a fourth temperature image essentially devoid of subject and object reflectance. These third and/or fourth images may then be viewed or processed to reveal representations of all concealed objects which have reflectivity and/or temperature different from the human subject.

The sensed apparent radiometric temperatures of an object are a combination of the temperature of that object, the temperature of the environment which that object reflects to the radiometer, and the temperature of the object behind the object of interest, as viewed from the radiometer. This combination is approximated by Equation 1 below:

$$Ta=To*Eo+Te*Ro+Tb*Ao \qquad \text{Eq. 1}$$

where Ta is the resulting apparent temperature,
To is the temperature of the object,
Eo is the emissivity of the object,
Te is the temperature of the environment,
Ro is the reflectivity of the object,
Tb is the temperature of the object behind the object of interest as viewed by the radiometer, and
Ao is the transmissivity of the object.

For the purpose of this disclosure, the term Tb*Ao is ignored because highly transmissive objects are essentially transparent, such as clothing. The disclosed system and method perform a subtraction of two images or portions of images acquired under identical circumstances except that the environmental temperature has changed. Designating the first environmental temperature as Te1 and the second environmental temperature as Te2, the sensed radiometric value in environmental temperature condition 1 designated Ta1 is then defined by Equation 2 below:

$$Ta1=To*Eo+Te1*Ro \qquad \text{Eq. 2}$$

Similarly, the sensed radiometric value in environmental temperature condition 2 designated Ta2 is then defined by Equation 3 below:

$$Ta2=To*Eo+Te2*Ro \qquad \text{Eq. 3}$$

Subtraction of the value of Ta2 from Ta1 results in Equation 4 below:

$$Ta1 - Ta2 = ToEo - To^*Eo + Te1^*Ro - Te2^*Ro \qquad \text{Eq. 4}$$
$$= Ro^*(Te1 - Te2),$$
$$= Ro^*k$$

The resulting value of Equation 4 being referred to as the "reflectance" of the sensed data because the terms Te1 and Te2 are constants, and may be completely known and therefore the value "k" may be substituted for their difference, and the result is completely devoid of the temperature of the material. To reintroduce the term Tb*Ao it can further be shown that objects which have partial transmissivity (are partially transparent) will exhibit a value which is a mixture of the reflectance of the object and the reflectance of the background object as viewed from the radiometric sensor.

Furthermore, because emissivity and reflectivity generally sum to 1, and except for highly transparent objects, their actual temperatures, devoid of the effects of the environmental reflections upon them can be determined by processing the sensed values Ta with one of the known environmental temperatures Te1 and the reflectance value Ro obtained above.

$$\text{(generally) } Eo+Ro=1 \qquad \text{Eq. 5}$$

Recall Eq. 2 Ta1=To*Eo+Te1*Ro
By substitution $$To=(Ta-Te1*Ro)/(1-Ro) \qquad \text{Eq 6}$$

Where all the quantities on the right side are known.

Below is an example based on the above equations:

$$Ta=To*Eo+Te*Ro+Tb*Ao \qquad \text{Eq. 1}$$

where Ta is the resulting apparent temperature,
To is the temperature of the object for this example set to 305 Kelvin,
Eo is the emissivity of the object for this example set to 0.8,
Te is the temperature of the environment set to two states for this example, Te1=280 Kelvin, Te2=295 Kelvin,
Ro is the reflectivity of the object for this example set to 0.2,
Tb is the temperature of the object behind the object of interest as viewed by the radiometer for this example set to 305 Kelvin, and
Ao is the transmissivity of the object for this example set to 0 (zero)

Filling in Equations 2 and 3 yields:

$$Ta1=305*0.8+280*0.2=300 \text{ Kelvin} \qquad \text{Eq. 2}$$

$$Ta2=305*0.8\ 295*0.2=303 \text{ Kelvin} \qquad \text{Eq. 3}$$

The result from Eq. 4 is the difference between Ta1 and Ta2, namely Ro*k=3. Wherein if the two environmental temperatures are know then k=295−280=15. Solving for Ro yields Ro=3/15=0.2

As can be seen in the above example, the sensed values Ta1 and Ta2 of 300 and 303 Kelvin, respectively, result in a purely reflectance value Ro*k, wherein with knowledge of the difference between the two environmental temperatures k, the value of reflectance Ro is determined to be 0.2 which is the correct value, and is devoid of object temperature influence.

The original temperature To can be discovered from the known values and the derived reflectance Ro. In this example the sensed data Ta1=300 Kelvin and the reflectance derived Ro=0.2 using equation 4. Te1 in this example is known to be 280 Kelvin, so using equation 6, Te1*Ro=(280*0.2)=56, subtracted from Ta1 yields 244 for the numerator. 244 is divided by 1−R=(1−0.2)=(0.8) to yield a value for To of 305 Kelvin which is the correct value in this example.

Figure 1:
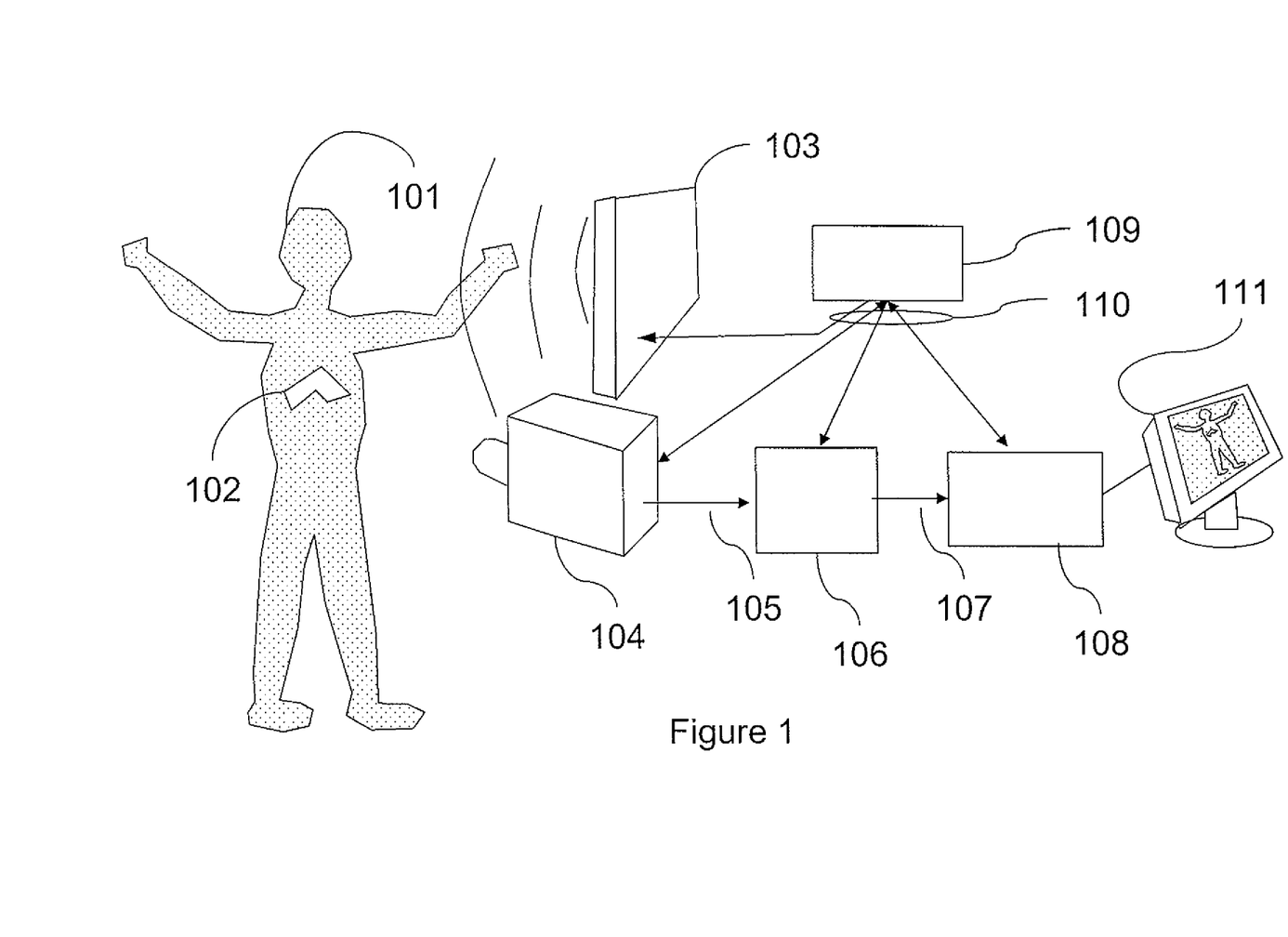
FIG. 1 depicts a system for obtaining passive thermal images of a subject and concealed objects in which the environmental temperature is controlled.

Referring to FIG. 1 depicts a thermal sensing system 100 for obtaining and displaying the reflectance and/or temperature of a scene containing a subject human 101 and possible concealed object 102. Thermal sensing system 100 comprises thermal emitter 103, imaging sensor 104, data storage device 106, processor unit 108, synchronization device 109 and display/signal unit 111. In the disclosed techniques, the scene is essentially illuminated by the thermal environment, which is provided synthetically by environmental thermal emitter 103 which can be operated in at least two states of temperature. The scene is imaged by imaging sensor 104 at some wavelength wherein the clothing of human 101 normally obscures the concealed object 102 in visual wavelengths, but in wavelength of the imaging sensor 104, such obscuring clothing is essentially transparent.

FIG. 1 further depicts the transference of data 105 which represents the sensor response in a numerical digital form such as a stream of numbers or other electrical analog form such as voltage over time. Such data 105 are stored temporarily in a data storage device 106 which may be digital or analog in nature. Synchronization device 109 provides signals 110 of at least an off and an on state, and distributes those signals to various components of the system, namely the thermal emitter 103, the sensor 104, the data memory unit 106 and the processor unit 108.

Data stored temporarily in the data storage unit 106 is transferred to the processing unit 108 which may be analog or digital, and wherein processing is performed, such processing may include, but is not limited to, the subtraction of the data collected at one of the synchronization states from the data collected at another of the synchronization states, as described herein as well as other possible functions. Display/signal unit 111 provides a visual display and/or signal to indicate the presence of concealed objects.

Figure 2:
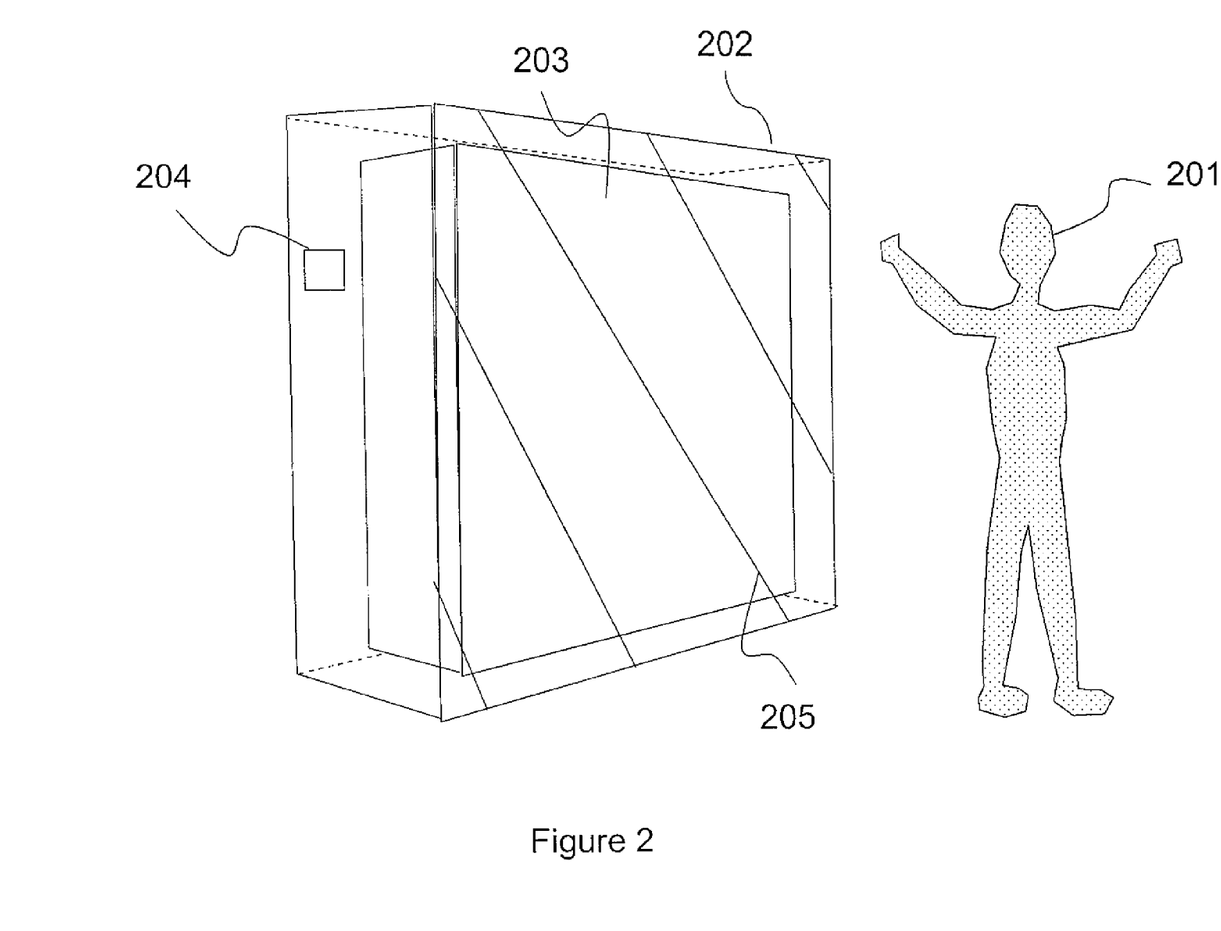
FIG. 2 illustrates a thermal illumination device which switches between at least two temperature states.

FIG. 2 depicts a thermal illumination device 202 wherein the interior 204 of the device is controlled so that it remains at a fixed temperature. An electronically controlled thermal emitter 203 embedded within this interior space 204 is capable of raising the apparent temperature of the enclosure when activated by the synchronization signal 110 of FIG. 1 (e.g. from synchronization source 233) to at least one of a set of thermal states. The result is the creation of at least two thermal illumination states, each of a different temperature, providing environmental temperatures for the subject 201. If necessary, an optional scattering material 205 may be employed to mix the temperature of the interior of the space 204 with the electronically controlled thermal emitter 203.

When the electronically controlled emitter 203 is in the off state, then the apparent temperature of the thermal illumination device 202 is that of the interior 204 physical temperature of the thermal illumination device. When the electronically controlled emitter 203 is in the on state, then the apparent temperature of the thermal illumination device 202 is a combination of the temperature of the interior 204 physical temperature and the controlled emitter 203 temperature. The effect of this embodiment is to modulate the scene illumination temperature in synchrony with the synchronization signal 110 of FIG. 1.

Thermal emitter 203 may be implemented with any of the following: gas discharge tubes wherein gasses, notably the noble gases, are brought to ionized (plasma) states by impressing of high voltage; electrically heated filaments, and electronically generated radio frequency noise sources. The latter can be expressed as multiple sources at different frequencies or broadband noise sources which mimic actual thermal energy. Distribution of electronically generated noise sources is difficult in that the distribution of the signal must be fairly uniform, have broad directionality, and be wide in spectral content. As described elsewhere, a thermally controlled surface of fairly large subtended angle as viewed by patches of the subject is necessary to effectively obtain a reflectance image for concealed object detection. In one embodiment, thermal emitter 203 may be implemented with an electronic noise module, model TN165, commercially available from High Energy Devices LLC, Maryland Heights, Mo., along with appropriate signal dividers and antennas such as those commercially available from Qinstar Technology, Inc of Torrance, Calif.

The interior space 204 may be set to a temperature below the normal room temperature and the temperature of the electronic emitter 203 may be set so that its highest temperature is at or below room temperature. By so doing the system does not increase the electromagnetic energy in the environment beyond that of the normal thermal environment at any and all wavelengths.

Figure 3:
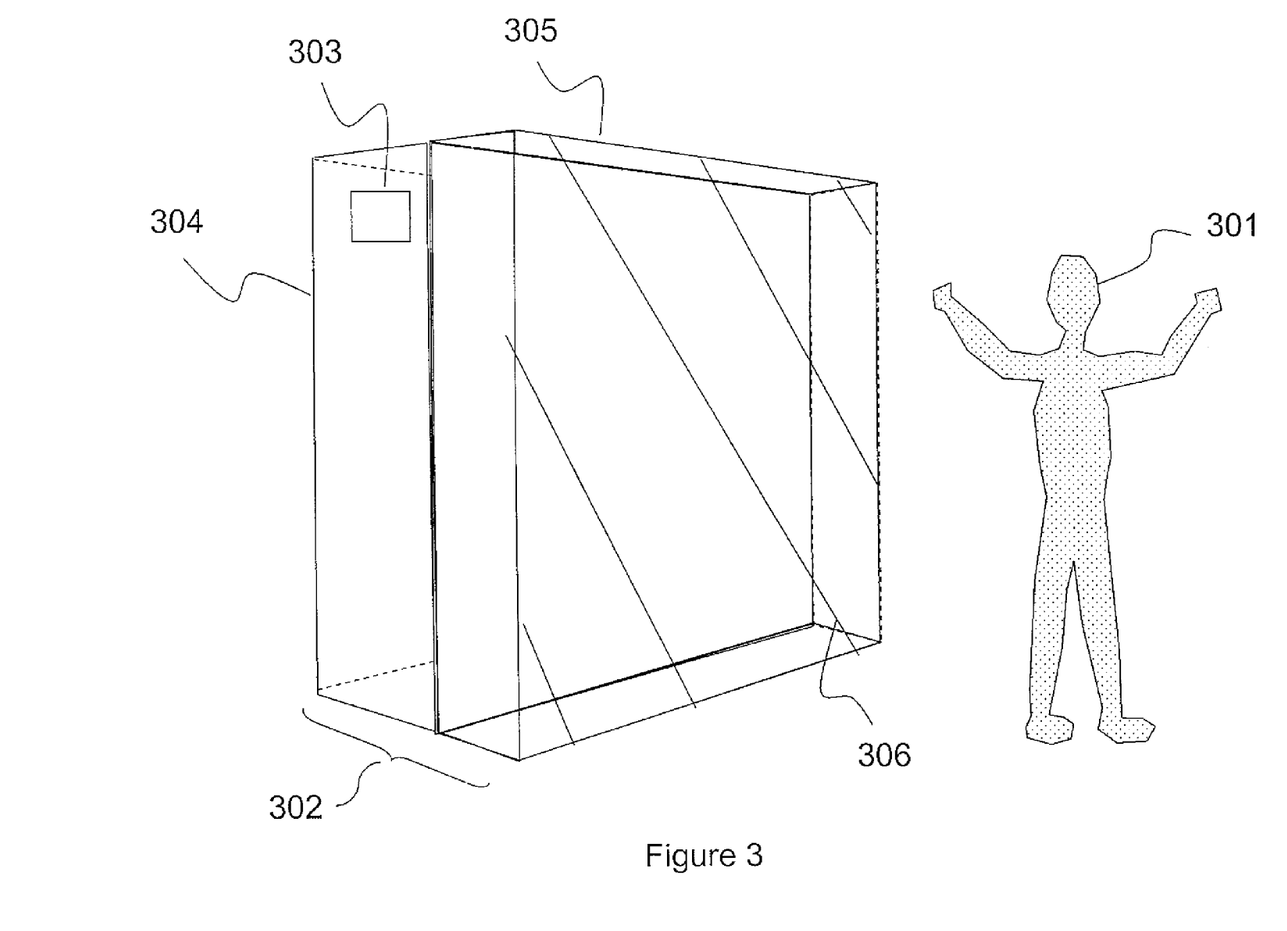
FIG. 3 illustrates a mechanical system of thermal illumination which switches between at least two temperature states.

FIG. 3 depicts another embodiment of a thermal illumination device 302, wherein an interior 303 of a first chamber 304 of the device 302 is controlled so that it remains at a fixed temperature. An electronically controlled mechanical device 305 on the exterior of first chamber 304, but between the first chamber 304 and the subject 301, exhibits a temperature different from the interior 303 of the chamber 304. The synchronization signal 110 of FIG. 1 (e.g. from synchronization source 233) provides electronic control to select one of at least two thermal states, which is then used to activate the mechanical device within 305 which by occlusion of the fixed internal temperature by its own temperature therefore alters the thermal state of the entire illumination device 302. The effect of this embodiment is to modulate the scene illumination temperature in synchrony with the synchronization signal 110 of FIG. 1. If necessary, an optional scattering material 305 may be employed to mix the temperature of the interior of the space 303 with the mechanically controlled thermal subsystem 306.

The interior space 303 of chamber 304 may be set to a temperature below the normal room temperature and the temperature of the mechanical devices of 302 may be set so that at their highest temperature they are at or below room temperature. By so doing the system does not increase the electromagnetic energy in the environment beyond that of the normal thermal environment at any and all wavelengths.

Figures 4A, 4B, 4C, 4D:
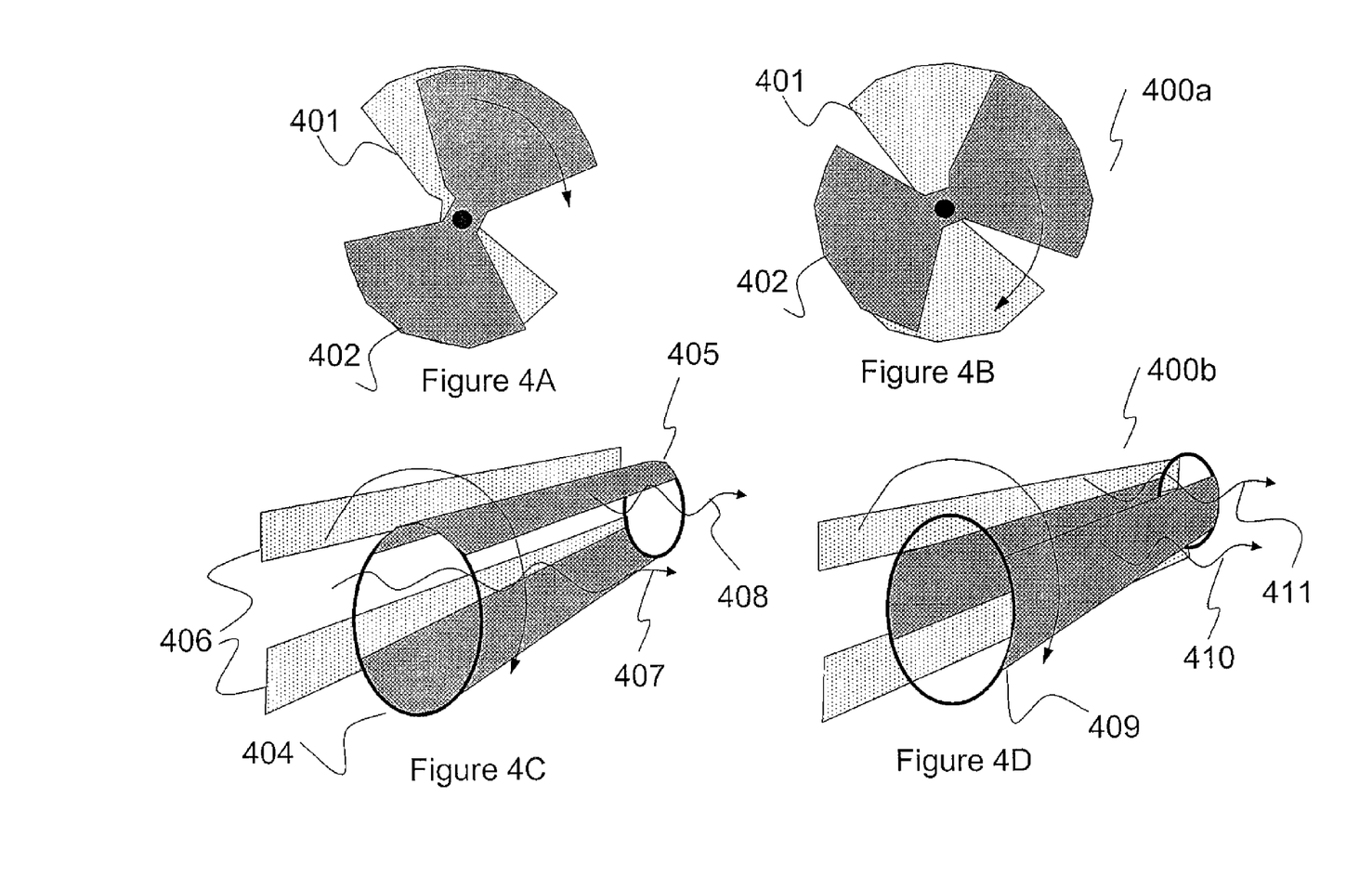
FIGS. 4A-H illustrates embodiments of the apparatus for creating alternating thermal states.

FIGS. 4A-H multiple embodiments of mechanical devices which may be used to perform the mechanical temperature control of device 302 of FIG. 3. All of these examples may be controlled by the states of the synchronization signal 110 in FIG. 1. FIGS. 4A-B illustrates a device 400a comprising a fixed opaque and emissive device 401 having a second temperature, different from the first temperature of the interior 303 of chamber of 304 of device 302, and a movable opaque and emissive device 402 also having said second temperature or a third temperature. When movable device 402 is at a different rotational angle than fixed device 401, which remains stationary, as shown in FIG. 4B, a different apparent occlusion of the background will result. Accordingly, with different rotational angles, the apparent temperatures of the entire device 302 will change from a mixture of the background temperature from chamber 304 of 302 and the foreground temperature of 402 to a mixture of the foreground temperatures of 401 and 402. Device 400a may be implemented singularly or in a configuration of plural devices.

FIGS. 4C-D illustrate a device 400b comprising a generally elongated cylinder 404 divided lengthwise in a manner where emissive and opaque portions 405 have one of second or third temperatures, different from the first temperature of the interior 303 of chamber of 304 of device 302. Cylinder 404 is rotationally mounted parallel to an aperture defined by emissive and opaque patches 406 also having a second temperature different from a first temperature of chamber 304. Rotation of cylinder 404 about an axis presents a minimum of opacity at one rotational angle, as shown in FIG. 4C, and therefore present a mixture of the temperatures of the background of temperature from chamber 304, illustrated by wave 407 as transmission of that temperature, and the foreground temperature of the minimum presentation of patch 405, illustrated by wave 408 as emission of that temperature. As depicted in FIG. 4D, a maximum of opacity is achieved at an angle 90 degrees from the rotational angle of cylinder 404, as illustrated in FIG. 4C. In the rotational configuration illustrated in FIG. 4D, the resulting temperature is a mixture of the temperature of the aperture patches 406 illustrated by wave 411 and the cylinder portions 405 illustrated by wave 410. Different rotational angles of device 400b result in different apparent temperatures of the entire device. Note, the emissive opaque portions of cylinder 404 may vary by number, with, shape, opacity and respective temperature, depending on the desired temperature range. Device 400b may also be implemented singularly or in a configuration of plural devices.

Figure 4E:
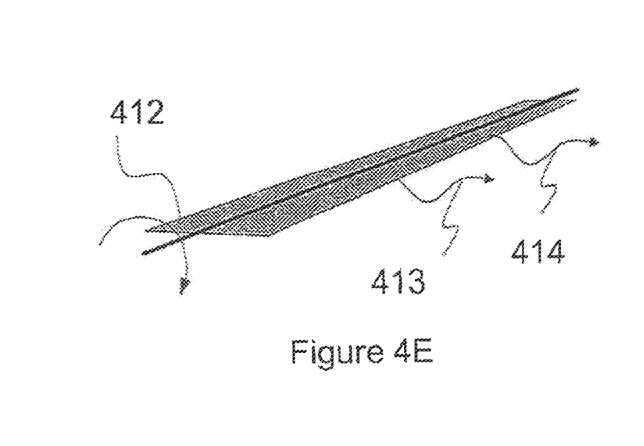
Figure 4F:
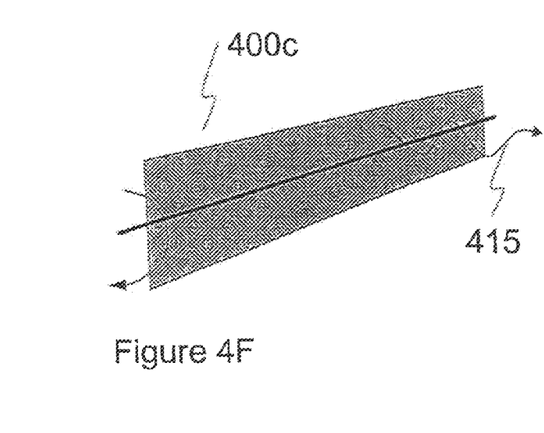

FIGS. 4E-F illustrate a device 400c comprising a relatively flat and long vane 412, rotated about an axis along its longest dimension, vane 412 being effectively opaque and emissive and at a temperature different from the interior 303 of chamber of 304 of device 302. When, during the rotation, vane 412 is at an angle where it presents a narrow profile, as in FIG. 4E, it has minimal affect upon the temperature from the chamber 304, as illustrated by wave 413 and the minimum profile emissions illustrated by wave 414. When vane 412 is most opaque, as shown in FIG. 4F, the angle being 90 degrees from that illustrated in FIG. 4E, vane 412 has a maximum affect, primarily presenting a temperature to the subject 301 of the temperature of vane 412, as illustrated by wave 415. Similar to devices 400a and 400b, 400c may also be implemented singularly or in a configuration of plural devices.

Figure 4G:
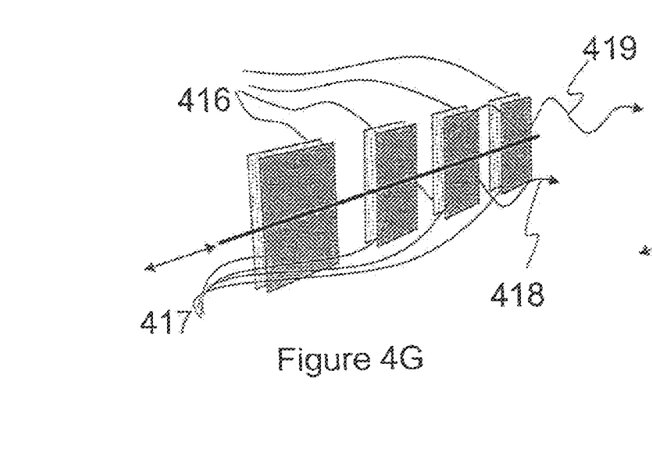
Figure 4H:
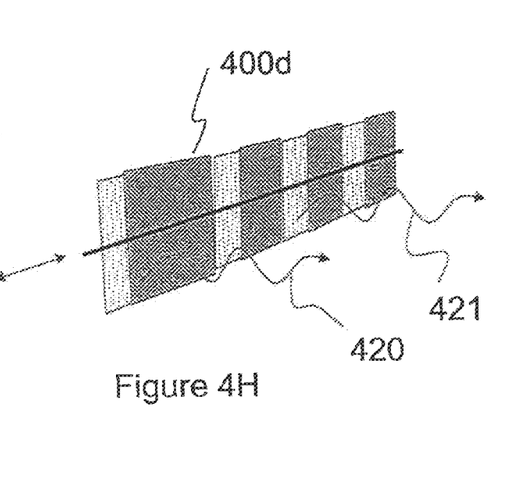

FIGS. 4G-H illustrates a device 400d comprising a set of fixed emissive opaque patches 416 which have a second temperature different from the first temperature of the interior 303 of chamber of 304 of device 302. Device 400d further comprises a set of movable emissive opaque patches 417, having similar shape and number as fixed patches 416, wherein the position of the set of movable patches 417 is translated relative to patches 416. Patches 417 may have said second temperature or a third temperature, either being different from the first temperature of chamber 304. In at least one state, the relative position of patch sets 416 and 417 presents a minimum opacity, as depicted in FIG. 4G wherein the system temperature is a mixture of the background temperature of chamber 304 as is illustrated by wave 418 and the temperature of the movable patches 417 as illustrated by wave 419. In another state, illustrated in FIG. 4H, device 400d presents maximum opacity, with the resulting temperature being a mixture of the temperatures of fixed patches 416, as illustrated by wave 421, and the temperatures of movable patches 417, as illustrated by wave 420. Similar to devices 400a-400c, 400d may also be implemented singularly or in a configuration of plural devices.

Figure 5:
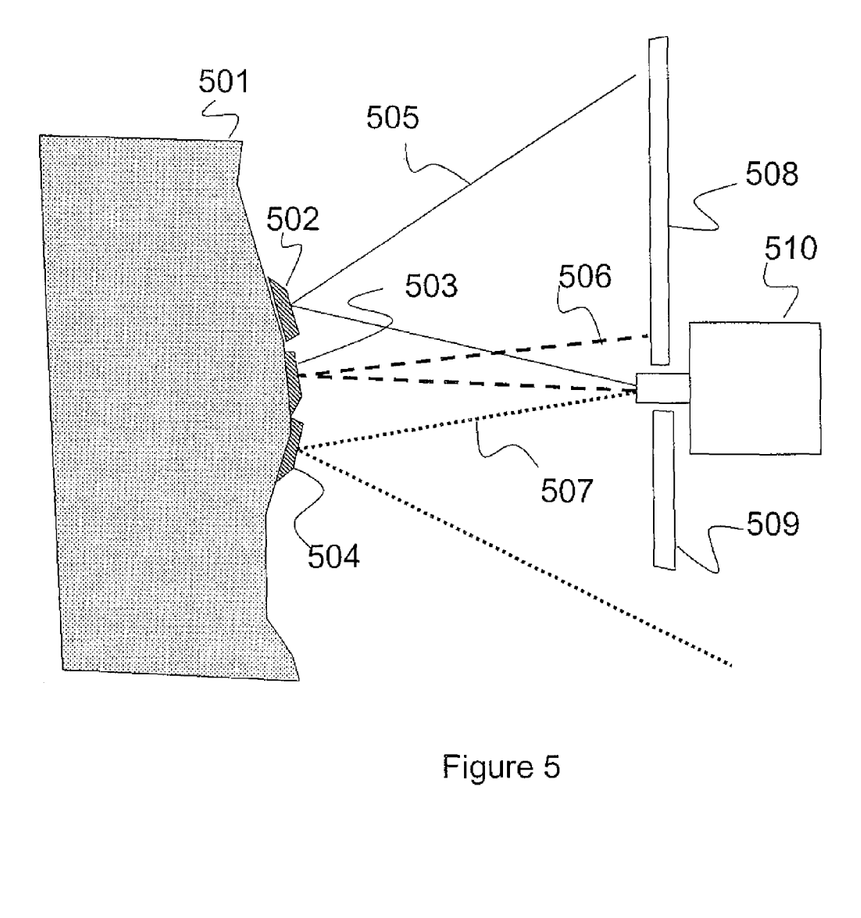
FIG. 5 depicts conceptually a variety of examples of patches on the subject or concealed object at orientations with respect to a sensor and the thermal illumination device.

FIG. 5 depicts a variety of examples of patches on a subject or concealed object at orientations with respect to the sensor and the thermally controlled illumination device. In order to obtain an essentially reflectance image, the environmental temperature should be presented as a thermally controlled surface of fairly large subtended angle as viewed by patches of the subject. Each patch of the subject or concealed object is presented in a manner that the patch reflects some portion of the environment towards the sensor. If the subtended angle of the thermally controlled surface is small, then the angles over which the patch will reflect the controlled temperature to the sensor is also small. A perfect thermally controlled surface would subtend the entire sphere centered on the subject, however, such a device is inherently impractical both in the consumption of space and cost. Generally, only those patches near the edges of the subject, as viewed from the sensor, are likely to reflect temperatures outside the hemisphere on the sensor side of the subject. Practical systems may be constructed where even smaller portions of the environment than the hemisphere are controlled. The subject and concealed object is represented by 501 as a body with a surface oriented generally toward both the sensor 510 and the thermally controlled illumination sources 508 and 509. Three patches of the subject or concealed object are shown by 502, 503 and 504. Lines showing the portion of the environment reflected to the sensor by the patches are shown by 505 for patch 502, by 506 for patch 503 and by 507 for patch 504, respectively. In this example, the environment that strongly affects the reflected energy, as sensed by the sensor 510, is the thermally controlled device 508 for the case of patches 502 and 503 because the thermal environment which those patches reflect into the sensor includes a direct path from the device 508, and that for patch 504, the thermally controlled device 509 is not strongly affecting the sensed reflected energy because the thermal environment which that patch reflects in the sensor does not include a direct path from the device 509.

Figure 7:
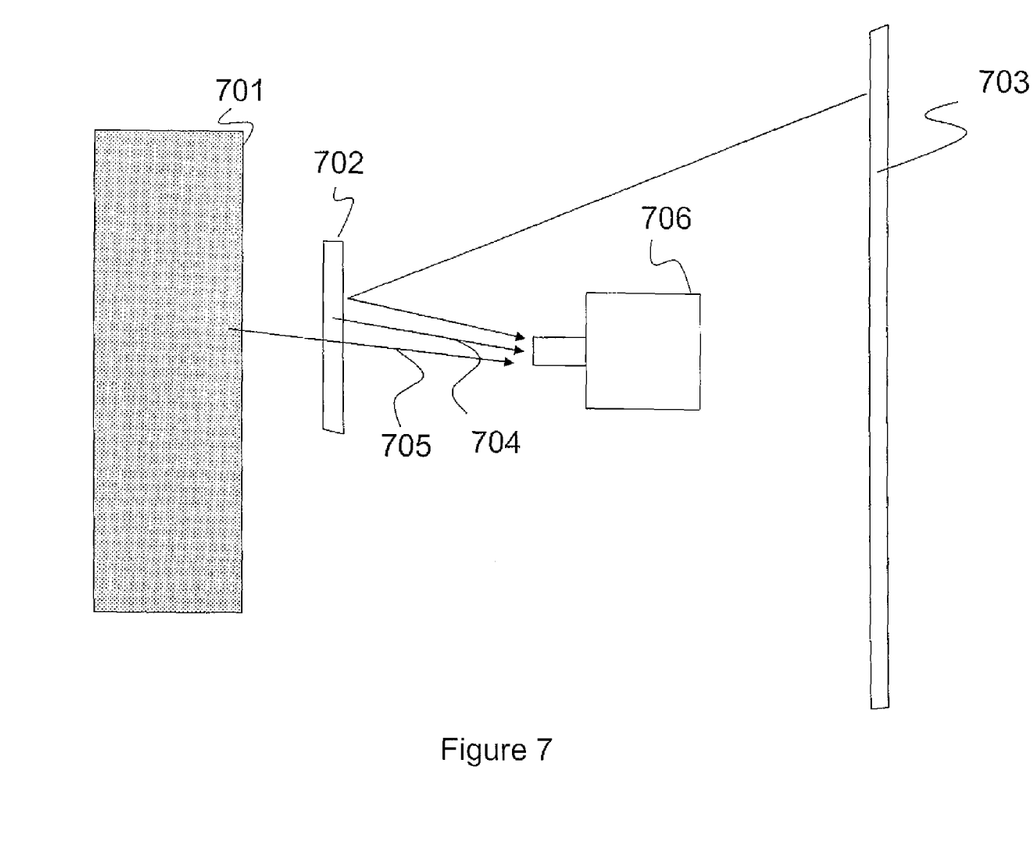
FIG. 7 depicts the thermal condition of an object as sensed by a radiometric sensor.

FIG. 7 depicts the radiometric scene including essential components as sensed by a radiometer. In FIG. 7, the foreground object 702 posses properties of emissivity, reflectivity and transmissivity. Those properties contribute to the sensed temperature sensed by the radiometer 706. The temperature of the environment 703 is reflected to the radiometer 706 in accordance with the reflectivity of the object 702 as depicted in the line 704. The temperature of the object 702 is sensed by the radiometer 706 in accordance with the emissivity of the object 702 as depicted in the line 704. The temperature of the background body 701 is sensed by the radiometer 706 in accordance with the transmissivity of object 702 as depicted in the line 705. All these sources of energy are summed at the radiometer to form one temperature being sensed and so the sensed temperature is a combination of the three properties of the object, the object's temperature, the environmental temperature and the background body temperature.

The reader will appreciate that the disclosed system and techniques overcome the effects of temperature and reveal reflectivity by the creation of a reflectance image of the subject in a passive thermal imaging system. Furthermore, although the thermal environment is controlled, it is possible in a set of embodiments to choose temperatures lower to and/or equal to normal room temperature or outdoor temperature, thereby creating an environment where, in every thermal state and at all wavelengths, the energy is equal to or less than normal thermal environments. Normal temperature is a term used herein to describe the ambient temperature where the system is operating.

The disclosed system and techniques are not limited to the millimeter wave portion of the spectrum because other wavelengths are useable for concealed detection on humans where the clothing is essentially transparent. The primary reason that millimeter wavelengths and those nearby are often used is for practical reasons of size of optical elements and availability of affordable detection and amplification electronic devices. Optical element size is dictated by physical phenomena relating size and wavelength to resolution, and affordable electronics relies on the state of technology.

Figure 6A:
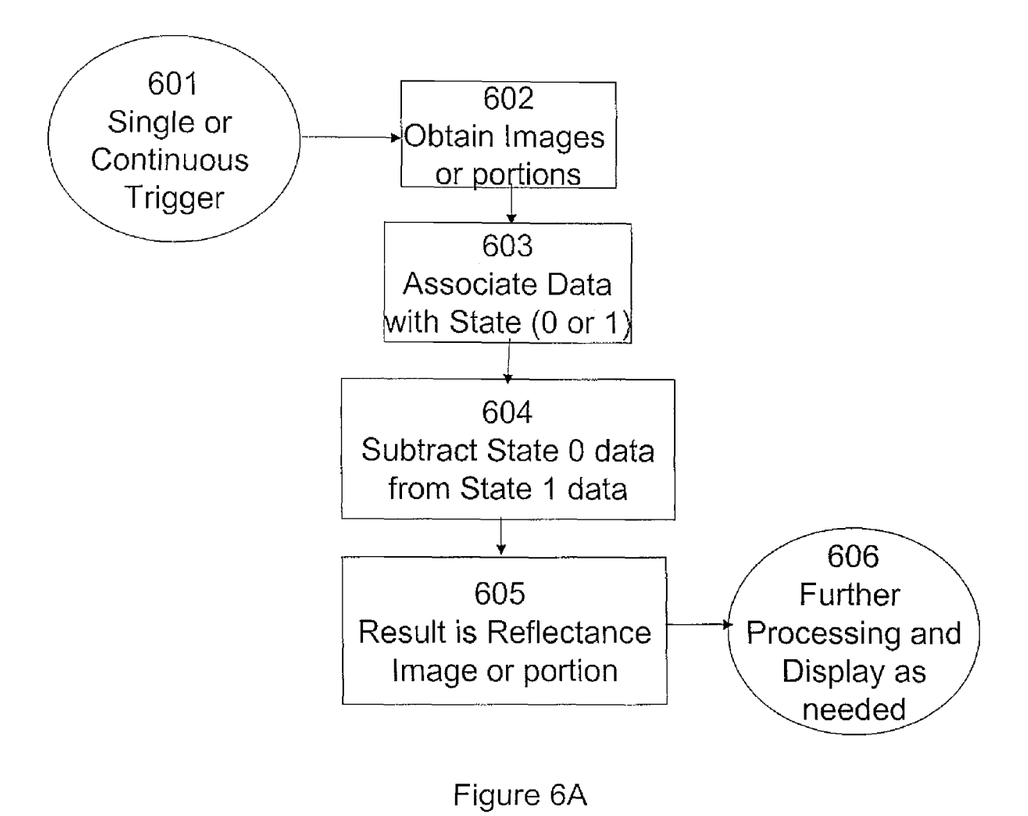
FIGS. 6A-B are conceptual flow diagrams illustrating the disclosed method for object detection using dual temperature images.
Figure 6B:
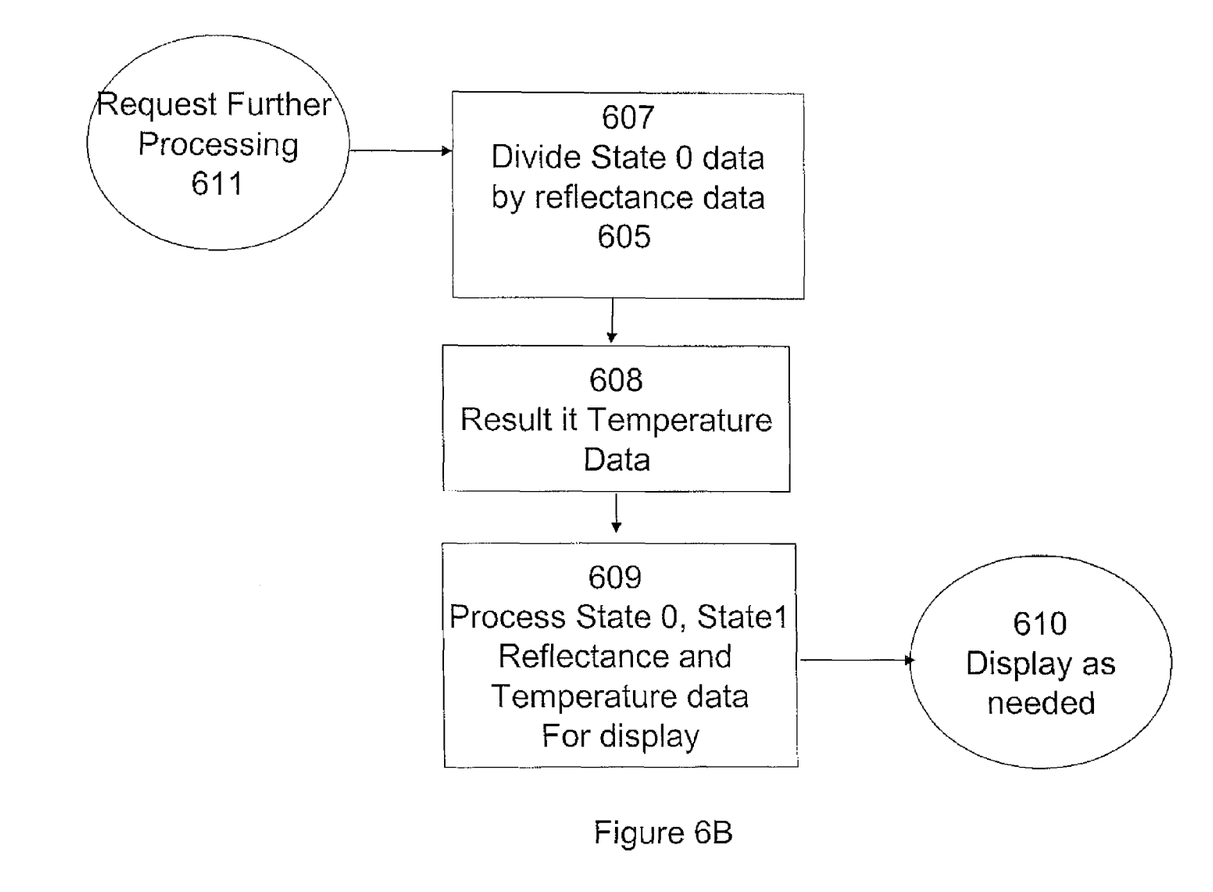

As depicted in FIGS. 6A-B the processes of the systems and apparatus described with reference to FIGS. 1-5 are utilized in conjunction with the dual temperature technique which switches between the two illumination temperatures. Starting with process block 601, individual or continuously triggered commands initiate the acquisition of data and an image or portion of an image is obtained at some environmental temperature state, as illustrated by process block 602. That environmental temperature state is associated with the data, as illustrated by process block 603. Data from alternate states are differenced, as illustrated by process block 604. The resulting data set is a reflectance image, as illustrated by process block 605. Optionally, further temperature images are processed, as illustrated by process block 606 and FIG. 6A and as described in more detail with reference to FIG. 6B. In process block 607, the State 0 (or the State 1) data are divided by the reflectance data generated at process block 605 if it is advantageous to provide temperature results devoid of reflectance, as illustrated by process block 608. In process block 609 all of the data are prepared as images or portions of images for display purposes, including any image processing to detect concealed objects, and such data displayed on a display apparatus, as illustrated by process block 610.

To obtain reflectance, one illumination temperature image is subtracted from the other illumination temperature image, regardless of the speed of acquiring the two temperature images as long as the subject has not moved appreciably between the two exposures.

In one embodiment, an entire image may be formed from acquired image portions. These image portions or "subsets" may be any portion of an entire image, wherein a set of these subsets are combined to form an entire image. In an ongoing image formation process which may produce successive images, whether from the same subject as might be needed for a real-time sequence or from successive subjects, each full image may be composited from subsets, that full image being one of a sequence of images. Furthermore, each image instance may be plural in nature, as described herein, that plurality comprising images from different environmental temperature states and different processing results from those images. A plurality of images might compose four separate images as follows: A state 0 image as acquired at a state 0 environmental temperature, a state 1 image as acquired at a state 1 environmental temperature, a reflectance image as obtained by differencing state 0 and state 1 image subsets and accumulating those reflectance subsets into a reflectance image, and a temperature image as obtained by use of reflectance subsets, acquired subsets, and other data, those temperature subsets then accumulated to form a temperature image.

Figure 6C:
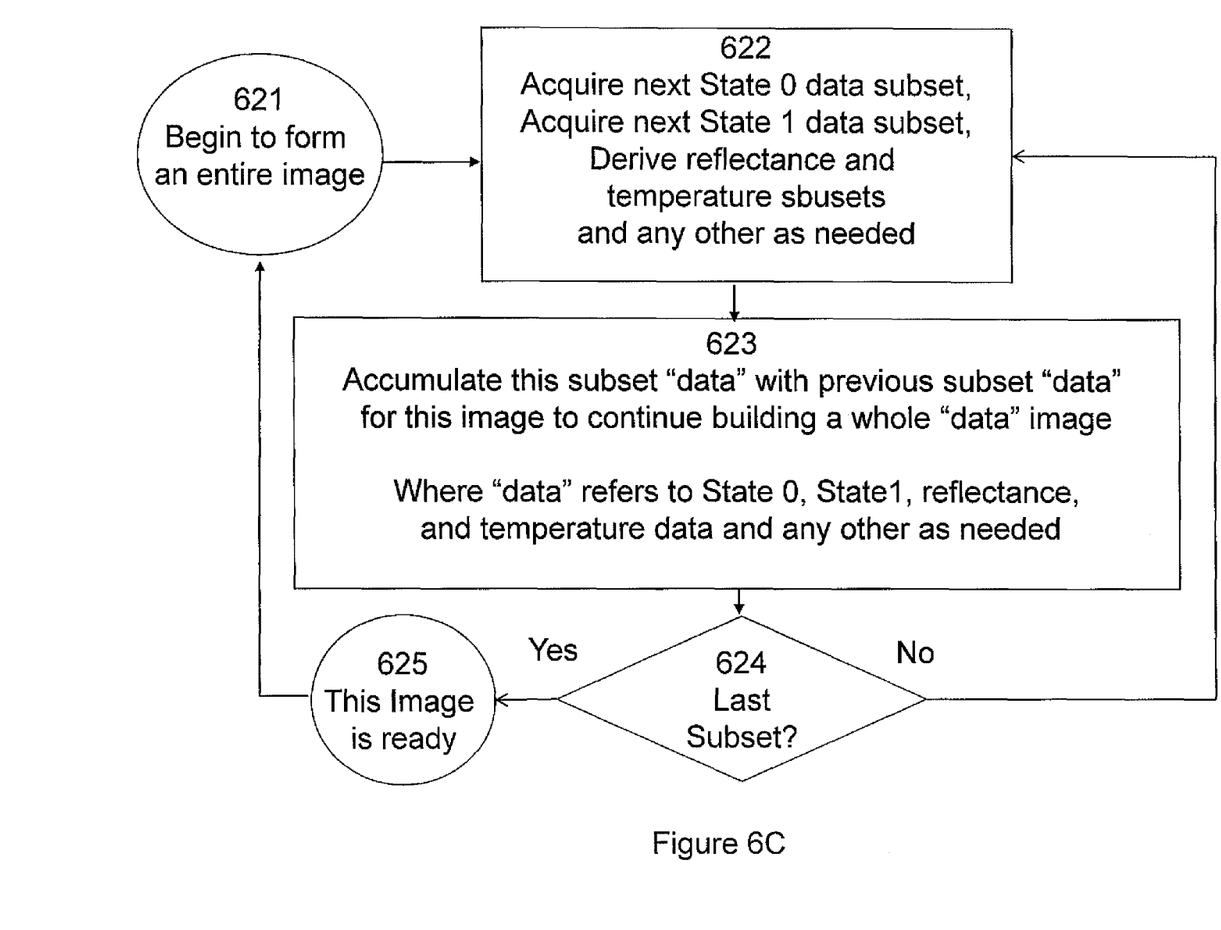
FIG. 6C illustrates the iterative process of acquiring, processing and composing individual image data subsets into composite image of a subject.

As shown in the FIG. 6C, some beginning state 621 triggers the first acquisition of a plurality of subsets for the first full images or as an ongoing process, the first plurality of subsets acquisition for some subsequent full image is triggered. Process block 622 represents the acquisition of two subsets, one of each state of the alternate environmental temperature states as described herein. Process block 622 also represents that processing necessary to derive other subsets which represent the reflectance state and the temperature state, as described elsewhere herein. Without loss of generality, the invention described herein might derive only one, any, or all of these subsets, or perhaps also other processing results not described herein. An image accumulator or other such mechanism is used to compose an entire image from subsets by the incorporation of those subset data together with other subset data until that image is fully formed as is understood by one skilled in the art. In this case, a plurality of subsets is being accumulated to form a plurality of respective images. Process block 623 represents the combination of each subset data set with the accumulated subset data set for the respective image accumulator. Decision process 624 determines if this is the final subset needed to compose an entire image. If it is not, then the next plurality of subset data are acquired as in 622. If it is the last subset, then the frame is complete (as notified by 625), and the next frame is started indicated in the process block 621.

In accordance with the above dual temperature technique, a system for imaging a subject may comprise: A) an imaging device for capturing a thermal images of the subject, the images containing both temperature and reflectance data; B) a device for changing the environmental temperature of the scene, the device providing an illumination sufficiently large and uniform to change the effective temperature impinging on the subject at the wavelengths that the imaging device operates, and capable of being switched on and off rapidly; C) a memory coupled to the imaging device for storing the plurality of images of a subject; and D) a processor coupled to the memory for creating processed images from data of a plurality of images, the composite images substantially devoid of temperature data from the plurality of thermal images of the subject. In another embodiment, the processor further creates an image essentially devoid of reflectance. In yet another embodiment, the processor further determines the existence of a threat based on the thermal images, the image devoid of temperature, the image devoid of reflectance or any combination thereof. The above system may operate on any subset of data from the imaging device, including a single sample at any instant, a final image or plurality of images being composed from said data subsets. Any imaging device may be used with such system at any wavelength wherein the temperature of the environment is changed at least at the wavelength being sensed.

In accordance with the system and techniques herein, a method for obtaining a reflectance image from a plurality of thermal images representing wavelengths comprises: A) obtaining a first thermal image of a subject, the first image containing both temperature and reflectance data; B) changing the environmental temperature of the scene, C) obtaining a second thermal image of the subject, the second image containing both temperature and reflectance data from the scene with said changed environmental temperature; and D) deriving a third image from the first and second images, that third image being essentially a reflectance image. In one embodiment, the third image being derived by subtracting the data in the first image from the data in the second image, or subtracting the data in the second image from the data in the first image. In another embodiment, either of the first or second images is further processed with the third image to produce a temperature image substantially devoid of reflectance information.

The present invention is illustratively described above in reference to the disclosed embodiments. Various modifications and changes may be made to the disclosed embodiments by persons skilled in the art without departing from the scope of the present invention. Accordingly, the appended claims shall not be limited by the particular features which have been shown and described, but shall be construed also to cover any obvious modifications and equivalents thereof.

What is claimed is:

1. A method for obtaining a reflectance image of a concealed object at a scene from a plurality of thermal images, the method comprising:

obtaining a plurality of images, the plurality of images containing both temperature and reflectance data;

synchronously changing illumination conditions at the scene between at least two different states for pairs of first and second images of the plurality of images; and deriving a third image from a pair of the images, the third image being a reflectance image, wherein a concealed object, with one of lesser or greater reflectance than reflectance generated by a human surface, generates a visible contrast on the third image.

2. The method of claim 1 wherein the third image is derived by subtracting data in a first image of the pair from data in a second image of the pair.

3. The method of claim 1 wherein the third image is derived by subtracting data in a second image of the pair from data in a first image of the pair.

4. The method of claim 1 wherein the third image is pointwise multiplied by a respective environmental temperature at the scene, then pointwise subtracted from one of the first and second images of the pair, and then pointwise divided by the third image everywhere subtracted from the value 1 to produce a temperature image devoid of reflectance information.

5. A method for obtaining a thermal reflectance image, the method comprising:

obtaining a plurality of thermal images of a human subject at a scene, the plurality of thermal images representing a mixture of temperature data and reflectance data, the first plurality of thermal images obtained at a first environmental temperature;

changing the first environmental temperature of the scene to a second environmental temperature;

obtaining a second plurality of thermal images of the human subject at the scene at the second environmental temperature, the second plurality of thermal images representing a mixture of temperature data and reflectance data;

creating a third image from data of the first and second plurality of thermal images, the third image being a composite reflectance image substantially devoid of temperature data from the first and second plurality of thermal images;

deriving an additional temperature image from the first and second plurality of thermal images and the composite reflectance image by:
- composing a first composite image from the first plurality of images obtained at the first environmental temperature,
- composing a second composite image from the second plurality of images obtained at the second environmental temperature,
- composing a third composite image from the first and second composite images by pointwise subtracting one of the first and second composite image from the other of the first and second composite image, and
- composing a fourth composite image by:
  - pointwise multiplying a known respective environmental temperature by the third image to obtain a first result,
  - pointwise subtracting the first result from one of the first and second image to obtain a second result, and
  - pointwise dividing the second result by the third image everywhere subtracted from a value of 1, resulting in a temperature image substantially devoid of reflectance information.

6. The method of claim 5 wherein creating the third image comprises:
subtracting one of the first and second plurality of thermal images from the other of the first and second plurality of thermal images.

7. A method for obtaining a thermal reflectance image, the method comprising:
obtaining a plurality of thermal images of a human subject at a scene, the plurality of thermal images representing a mixture of temperature data and reflectance data, the first plurality of thermal images obtained at a first environmental temperature;
changing the first environmental temperature of the scene to a second environmental temperature;
obtaining a second plurality of thermal images of the human subject at the scene at the second environmental temperature, the second plurality of thermal images representing a mixture of temperature data and reflectance data;
creating a third image from data of the first and second plurality of thermal images, the third image being a composite reflectance image substantially devoid of temperature data from the first and second plurality of thermal images;
pointwise subtracting pairs of thermal images resulting in a third plurality of images representing reflectance data, wherein each pair of thermal images comprises a thermal image from the first plurality of thermal images and a thermal image from the second plurality of thermal images; and
combining the third plurality of images into a single reflectance image.

8. A method for obtaining a thermal reflectance image, the method comprising; obtaining plurality of thermal images of a human subject at a scene, the plurality of thermal imagines representing a mixture of temperature data and reflectance data, the first plurality of thermal images obtained at a first environmental temperature; changing the first environmental temperature of the scene to a second environmental temperature; obtaining a second plurality of thermal images of the human subject at the scene at the second environmental temperature, the second plurality of thermal images representing a mixture of temperature data and reflectance data; creating a third image from data of the first and second plurality of thermal images, the third image being a composite reflectance image substantially devoid of temperature data from the first and second plurality of thermal images; creating a fourth plurality of temperature images substantially devoid of reflectance information by: pointwise multiplying a known respective environmental temperature by the third plurality of the reflectance images to obtain a plurality of first results, pointwise subtracting one of the plurality of first results from the one of the first plurality of images or one of the second plurality of images image to obtain a plurality of second results, and pointwise dividing one of the plurality of second results by one of the third of plurality of the reflectance images everywhere subtracted from a value of 1, resulting in the fourth plurality of the temperature images substantially devoid of reflectance information, and combining the fourth plurality of temperature images into a single temperature image.

9. A system for imaging a subject at a scene, the system comprising:
an imaging device for capturing a plurality of thermal images of the subject, the thermal images containing both temperature and reflectance data;
a device for synchronously changing illumination conditions at the scene between at least two different states, the device providing an illumination in each state sufficiently large and uniform to change an effective temperature impinging on the subject at wavelengths at which the imaging device operates, so that a thermal image of the subject exists for each of the two different states;
a memory coupled to the imaging device for storing the plurality of thermal images of the subject; and
a processor coupled to the memory for creating composite processed images from data of a plurality of the thermal images, the composite processed images substantially devoid of temperature data from the plurality of thermal images of the subject.

10. A method for obtaining a reflectance image from a plurality of a passive millimeter sensor images, the method comprising:
obtaining a first plurality of passive millimeter images of a subject within a control environment, the first plurality of passive millimeter images containing both temperature and reflectance data;
changing the environmental temperature of the scene uniformly,
obtaining a second plurality of passive millimeter images of the subject, the second plurality of passive millimeter images containing both temperature and reflectance data from the scene including the subject; and deriving a third image from the first and second plurality of passive millimeter images, the third image being a reflectance image, wherein a concealed object, with one of lesser or greater reflectance than reflectance generated by a human, generates a visible contrast on the third image.

11. A system for imaging a subject at a scene, the system comprising:

a passive millimeter imaging device for capturing a plurality of images of the subject within a control environment, the plurality of passive millimeter images containing both temperature and reflectance data;

a temperature control device for changing illumination conditions at the scene between at least two different temperature states, the temperature control device providing an illumination in each temperature state sufficiently large and uniform to change an effective temperature impinging on the subject at which the passive millimeter imaging device operates so that the imaging device can capture a plurality of images of the subject at two separate temperature states;

a memory coupled to the imaging device for storing the plurality of images of the subject; and a processor coupled to the memory for creating composite processed images from data of the plurality of the images, the composite processed images substantially devoid of temperature data from the plurality of images of the subject and the composite processed images being reflectance images.

12. The system of claim 11 wherein the processor further creates an image essentially devoid of reflectance data.

13. The system of claim 12 wherein the processor further determines the existence of a threat object based on one of the plurality of images, the image devoid of temperature data, the image devoid of reflectance data, or any combination thereof.

14. The system of claim 11 wherein only one composite image is created for the subject.

15. The system of claim 11 wherein a plurality of composite images are created for the subject.

16. The system of claim 11 wherein a continuous plurality of composite images is created for the subject.

* * * * *